(12) United States Patent
Wunsch et al.

(10) Patent No.: US 10,196,937 B2
(45) Date of Patent: Feb. 5, 2019

(54) METHOD AND SYSTEM FOR IMPROVING STRUCTURAL CHARACTERISTICS OF COMPOSITE COMPONENT CORNERS

(71) Applicant: General Electric Company, Schenectady, NY (US)

(72) Inventors: John Joseph Wunsch, West Chester, OH (US); Michael John Franks, Cincinnati, OH (US); Danielle Marie Greenfield, Cincinnati, OH (US); Michael Stephens Bodey, Fairfield, OH (US); Randall Maurice Prather, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 250 days.

(21) Appl. No.: 14/984,418

(22) Filed: Dec. 30, 2015

(65) Prior Publication Data

US 2017/0191448 A1    Jul. 6, 2017

(51) Int. Cl.
*F01D 25/24* (2006.01)
*F02K 1/78* (2006.01)

(52) U.S. Cl.
CPC .......... *F01D 25/243* (2013.01); *F01D 25/24* (2013.01); *F02K 1/78* (2013.01); *F05D 2300/121* (2013.01); *F05D 2300/603* (2013.01); *F05D 2300/702* (2013.01); *Y02T 50/672* (2013.01)

(58) Field of Classification Search
CPC .......... F01D 25/243; F01D 25/24; F02K 1/78; F02K 1/80; F02K 1/82; F02K 1/822; F02K 1/825; F02K 1/827; F05D 2300/603; Y02T 50/762; B64D 29/00; B64D 29/06; B64D 29/08; B64C 1/06; B64C 1/068; B64C 1/069; B64C 1/10; B64C 7/00; B64C 7/02
See application file for complete search history.

(56) References Cited

U.S. PATENT DOCUMENTS

| 1,860,940 A | * | 5/1932 | Morin | ............ H04B 1/08 217/65 |
| 3,912,407 A | | 10/1975 | Heininger | |
| 5,473,853 A | | 12/1995 | Guillemet et al. | |

(Continued)

FOREIGN PATENT DOCUMENTS

| EP | 1545986 B1 | 3/2010 |
| EP | 2431562 A2 | 3/2012 |

*Primary Examiner* — Steven Sutherland
(74) *Attorney, Agent, or Firm* — General Electric Company; Brian Overbeck

(57) ABSTRACT

A composite duct panel assembly is provided. The composite duct panel assembly includes a composite duct panel having a curved cross-section in a circumferential direction and a width based on the panel including a portion of a circumference of an annular bypass duct. In one embodiment, at least two adjacent corners of the panel are greater than 90°. In one embodiment, the panel includes a circumferential flange along a circumferential edge and an axial flange along an axial edge, and the assembly further includes a corner bracket coupled to the panel, the circumferential flange, and the axial flange. The corner bracket includes a flange corner having an approximate 90° angle, the flange corner extending the axial flange and the circumferential flange to an intersection at a corner of the panel.

20 Claims, 7 Drawing Sheets

(56) References Cited

U.S. PATENT DOCUMENTS

| | | | |
|---|---|---|---|
| 6,129,311 A * | 10/2000 | Welch | B29C 70/342 |
| | | | 239/265.31 |
| 7,967,248 B2 | 6/2011 | Halme et al. | |
| 8,079,773 B2 | 12/2011 | Blanton | |
| 8,267,354 B2 | 9/2012 | Kallinen et al. | |
| 8,715,809 B2 | 5/2014 | Ravey | |
| 2008/0223987 A1 | 9/2008 | Halme et al. | |
| 2013/0087635 A1* | 4/2013 | Balk | B64D 33/02 |
| | | | 239/265.11 |
| 2014/0301835 A1* | 10/2014 | Popescu | F01D 25/24 |
| | | | 415/182.1 |

\* cited by examiner

METHOD AND SYSTEM FOR IMPROVING STRUCTURAL CHARACTERISTICS OF COMPOSITE COMPONENT CORNERS

BACKGROUND

The field of the disclosure relates generally to composite panels and, more particularly, to a method and system for improving the structural characteristics of corners of a composite component, specifically by replacing composite corners with brackets of a separate construction.

Weight is of paramount importance in at least some known aircraft systems. Even small or incremental reductions in weight can decrease specific fuel consumption (SFC), which in turn reduces the cost of operation of the aircraft. As such, there is a benefit to replacing heavier components, such as metal, with lighter alternatives, such as composites (e.g., fiber-reinforced polymers or ceramics). However, there may be additional machining or manufacturing difficulties that arise with composite materials. In components which require well-defined and/or well-formed corners, composite materials present manufacturing difficulties which include poor consolidation, ply orientation rotation, bunching, and wrinkling of the plies in the three-dimensional corner. In addition to the structural issues posed by machined three-dimensional composite corners, such manufacturing may take a great deal of time, which in turn may increase manufacturing costs. Accordingly, it would be desirable to have a system that improves the corner structure of a composite component.

BRIEF DESCRIPTION

In one aspect, a composite duct panel is provided. The composite duct panel assembly includes a composite duct panel including a curved cross-section in a circumferential direction and a width that is based on the composite duct panel including a portion of a circumference of an annular bypass duct, at least two adjacent corners of the composite duct panel greater than 90°.

In another aspect, a composite duct panel assembly is provided. The composite duct panel assembly includes a composite duct panel having a curved cross-section in a circumferential direction. The duct panel includes a length extending axially along an axial first edge and a width extending along a circumferential second edge, a circumferential flange extending orthogonally away from the composite duct panel in a first direction along the circumferential edge, and an axial flange extending orthogonally away from the panel in the first direction along the axial edge. The composite duct panel assembly further includes a corner bracket coupled to the composite duct panel, the circumferential flange, and the axial flange. The corner bracket includes a base configured to couple to the panel, a first corner sidewall extending orthogonally away from the base in the first direction along a circumferential edge of the base, a second corner sidewall extending orthogonally away from the base in the first direction along an axial edge of the base, and a flange corner. The flange corner includes an axial flange extension and a circumferential flange extension intersecting at an approximate 90° angle, the flange corner extending the axial flange and the circumferential flange to an intersection at a corner of the panel.

In yet another aspect, a turbofan engine pod is provided. The engine pod includes a core engine including a multi-stage compressor, a fan powered by a power turbine driven by gas generated in the core engine, an inner core cowl at least partially surrounding the core engine and the fan, and an outer composite duct panel assembly. The composite duct panel assembly includes a composite duct panel having a curved cross-section in a circumferential direction, a width of the composite duct panel based on the composite duct panel including a portion of a circumference of an annular flow duct. At least two adjacent corners of the composite duct panel are greater than 90°.

In a further aspect, a composite panel assembly is provided. The composite panel assembly includes a composite panel, which includes a cross-section in a circumferential direction. At least two adjacent corners of the composite panel are greater than 90°.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the composite duct panel assemblies described herein provide a cost-effective method for reducing the weight of formed (e.g., metal) duct panel assemblies by using composite duct panels, and for improving the structural characteristics (such as stability, strength, connection, etc.) of at least one corner of at least one composite duct panel with a formed (e.g., metal) corner bracket. The duct panels include a curved cross-section and a plurality of flanges extending perpendicularly from a base. Each flange terminates a distance from a corner of the base, thereby defining corner edges of the duct panel. A corner bracket replaces composite corners of the duct panel and is coupled to the corner of the duct panel, thereby facilitating improved connection between adjacent duct panels and other adjacent structures. The corner bracket may be configured to increase a damage tolerance of the corner of the duct panel at which the corner bracket is affixed, improving the handleability of the duct panel during installation and removal.

Figure 1:
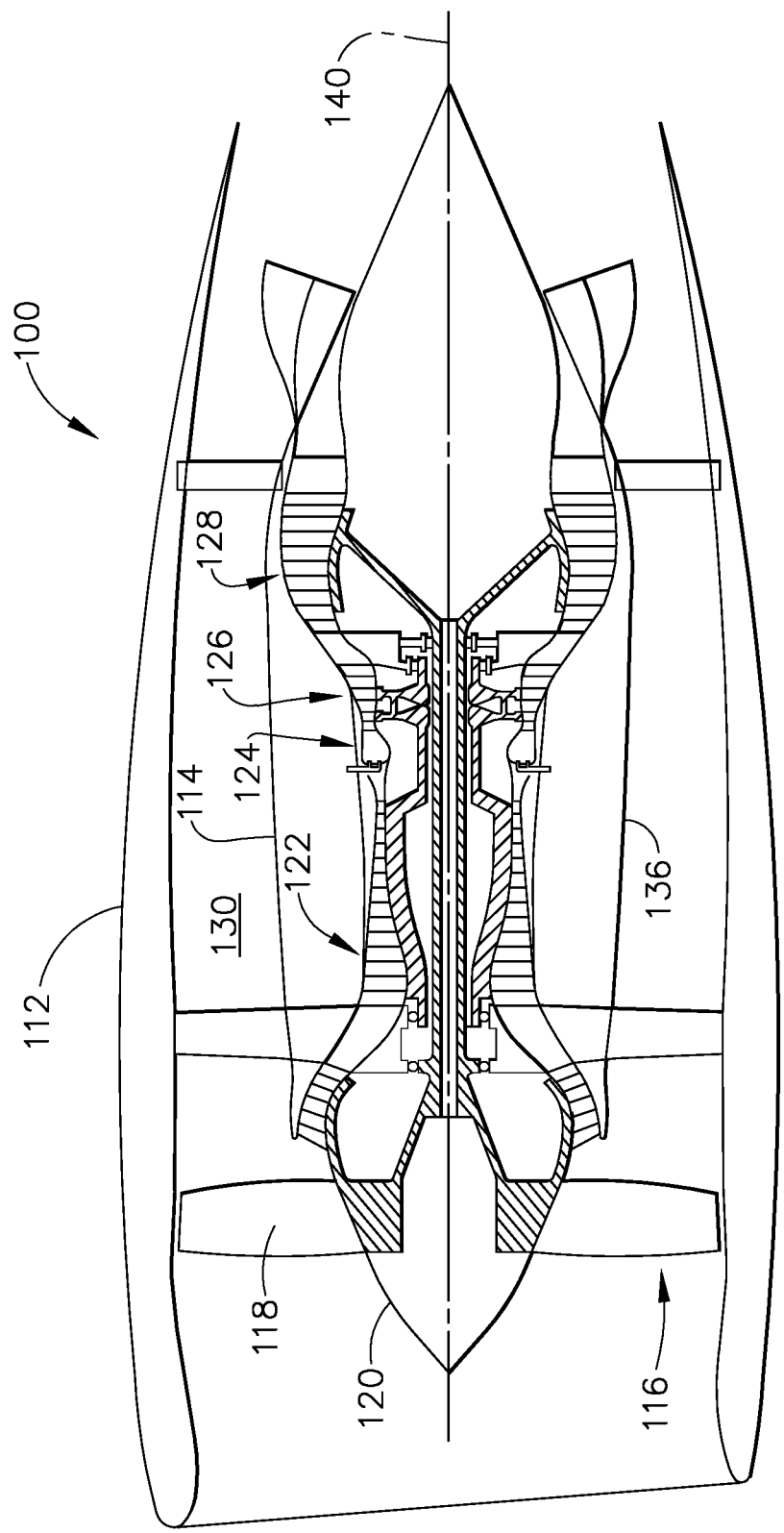
FIG. 1 is a schematic illustration of an exemplary gas turbine engine pod in accordance with an example embodiment of the present disclosure.

FIG. 1 is a schematic illustration of an exemplary gas turbofan engine pod 100 in accordance with an example embodiment of the present disclosure. Engine pod 100 is schematically represented as including a nacelle 112 and a core engine (module) 114. A fan assembly 116 located in front of core engine 114 includes a spinner nose 120 projecting forwardly from an array of fan blades 118. Core engine 114 is schematically represented as including a high-pressure compressor 122, a combustor 124, a high-pressure turbine 126 and a low-pressure turbine 128. A large portion of the air that enters fan assembly 116 is bypassed to the rear of engine pod 100 to generate additional engine thrust. The bypassed air passes through an annular-shaped bypass duct 130, centered along an engine centerline or axis 140. An inner core cowl 136 defines the radially inward boundary of bypass duct 130.

Figure 2:
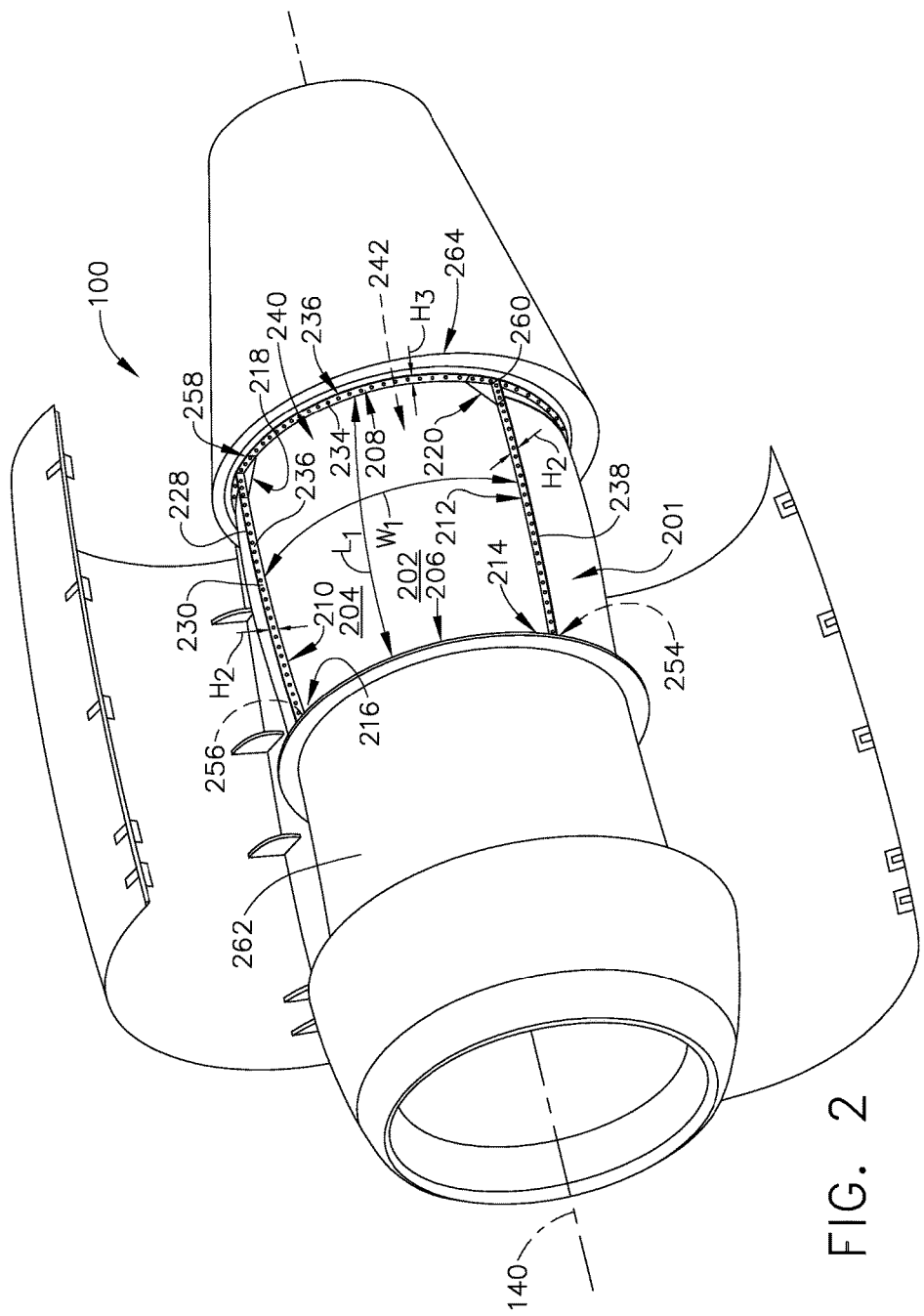
FIG. 2 is a perspective view of the engine pod shown in FIG. 1.

FIG. 2 is a perspective view of engine pod 100 (shown in FIG. 1). Engine pod 100 is surrounded by nacelle 112 (also shown in FIG. 1) and includes a fan housing 262, an outer fan duct 201 formed from a plurality of outer fan duct panels 202 (referred to herein as "duct panels") rigidly connected about axis 140, and an aft mount ring 264. Duct panels 202 define a radially outward boundary of bypass duct 130 (shown in FIG. 1). Accordingly, each duct panel 202 has a width $W_1$ predetermined and based on the radially outer circumference of bypass duct 130. Width $W_1$ extends circumferentially across duct panel 202, and a length $L_1$ of duct panel 202 extends axially across duct panel 202. Each duct panel 202 has a curved cross-section about axis 140 (i.e., in a circumferential direction), and includes a base 204 having a plurality of edges. More specifically, base 204 includes a forward edge 206, an aft edge 208, and opposing first and second side edges 210, 212. Forward edge 206 and aft edge 208 may be referred to as "circumferential edges," and first side edge 210 and second side edge 212 may referred to as "axial edges." Base 204 further includes corners 214, 216, 218, 220. Corner 214 is adjacent forward edge 206 and second side edge 212, corner 216 is adjacent forward edge 206 and first side edge 210, corner 218 is adjacent aft edge 208 and first side edge 210, and corner 220 is adjacent aft edge 208 and second side edge 212.

Duct panel 202 further includes a perimeter 228 defined by a plurality of flanges 230 that extend perpendicularly or axially outward from base 204. More specifically, duct panel 202 includes a forward flange 232 (shown in FIG. 3) extending substantially orthogonally outward from base 204 along at least a portion of forward edge 206, an aft flange 234 extending substantially orthogonally outward from base 204 along at least a portion of aft edge 208, a first side flange 236 extending substantially orthogonally outward from base 204 along at least a portion of first side edge 210, and a second side flange 238 extending substantially orthogonally outward from base 204 along at least a portion of second side edge 212. Forward flange 232 and aft flange 234 may be referred to as "circumferential flanges," and first side flange 236 and second side flange 238 may be referred to as "axial flanges." Each of the plurality of flanges 230 includes an outer surface 242 and an inner surface 240. The plurality of flanges 230 define a plurality of three-dimensional flange corners 254, 256, 258, 260 disposed at corresponding (panel) corners 214, 216, 218, 220.

In the illustrated embodiment, duct panel 202 is fixedly connected to fan housing 262 about core cowl 136 at forward edge 206 (e.g., along forward edge 206 and/or along forward flange 232). Duct panel 202 is fixedly connected to aft mount ring 264 at aft edge 208 (e.g., along aft edge 208 and/or along aft flange 234). Duct panel 202 is fixedly connected to adjacent duct panels 202 along first and second side edges 210, 212 (e.g., along first and/or second side edges 210, 212 and/or along first and/or second side flanges 236, 238). In some embodiments, forward flange 232 may have a height $H_1$ (see FIGS. 3 and 4C) that is greater than a height $H_2$ (also see FIGS. 3 and 4C) of first and second side flanges 236, 238, and/or aft flange 234 may have a height $H_3$ (also see FIG. 4C) that is greater than height $H_2$ of first and second side flanges 236, 238. For example, in some embodiments, a mechanical connection between duct panel 202 and fan housing 262 and/or aft mount ring 264 has different strength and/or space requirements than a mechanical connection between adjacent duct panels 202. Accordingly, in such embodiments, flange corner 254 between forward flange 232 and second side flange 238 bridges or supplies the difference between $H_1$ and $H_2$, flange corner 256 between forward flange 232 and first side flange 236 bridges or supplies the difference between $H_1$ and $H_2$, flange corner 258 between aft flange 234 and first side flange 236 bridges or supplies the difference between $H_3$ and $H_2$, and flange corner 260 between aft flange 234 and second side flange 238 bridges or supplies the difference between $H_3$ and $H_2$, such that perimeter 228 of duct panel 202 is continuous.

In some known aircraft systems, duct panels, or large portions thereof, are fabricated from metal. To facilitate reducing the weight of engine pod 100, at least a portion of duct panels 202 may be fabricated from a composite material including a plurality of plies, such as a polymer or ceramic material, reinforced with fibers such as carbon or glass fibers, in a resin matrix. However, as described herein, machining three-dimensional corners, such as flange corners 254, 256, 258, 260 of duct panel 202, causes a host of difficulties, and the resulting corners 254, 256, 258, 260 may be poorly consolidated, bunched, wrinkled, and/or otherwise poorly formed. Accordingly, providing a flush, complete, and/or strong connection between adjacent corners of adjacent duct panels, and/or between the corners and adjacent frames, may be difficult.

Figure 3:
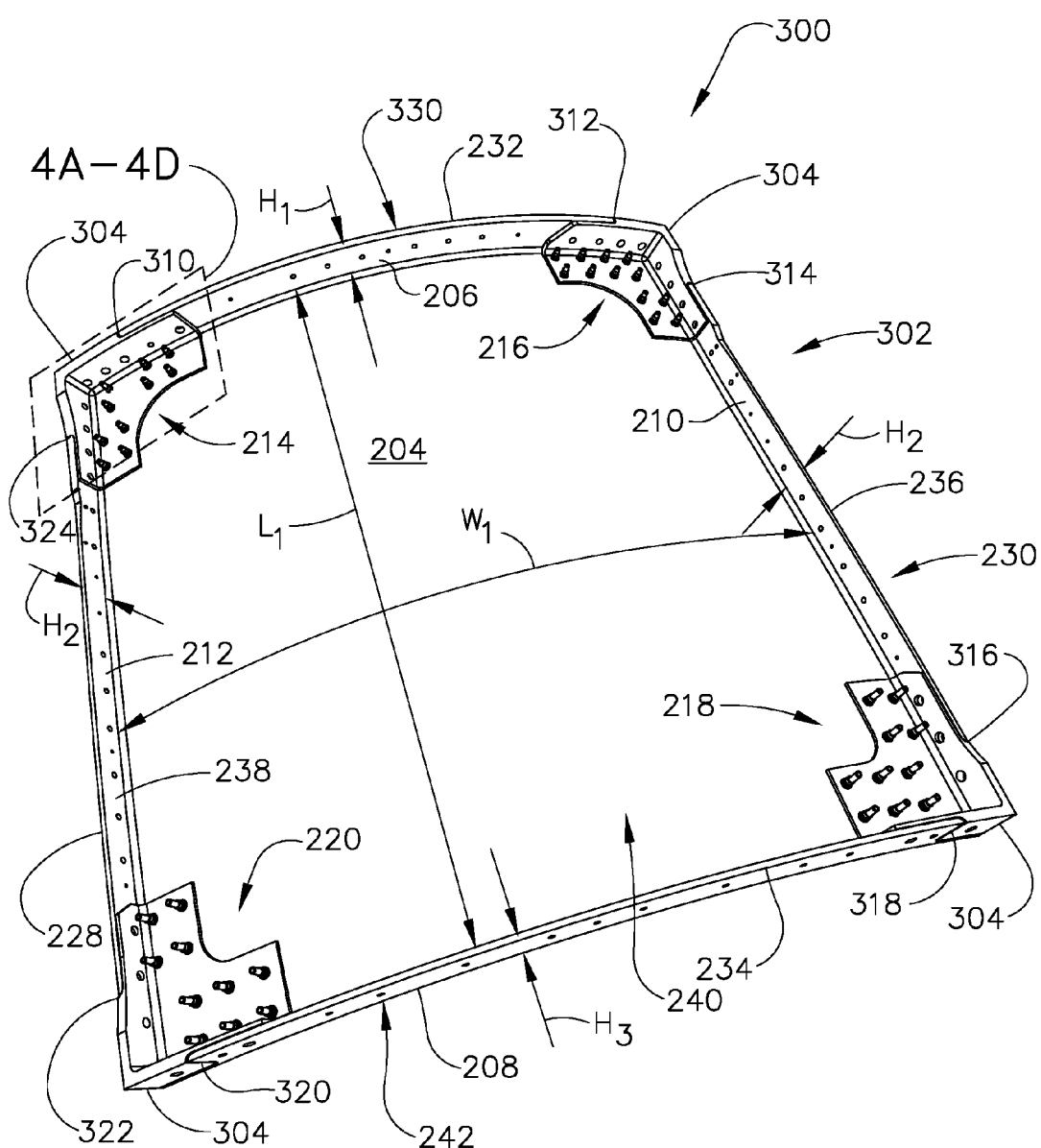
FIG. 3 is a perspective view of a first example embodiment of a composite duct panel assembly of the engine pod shown in FIGS. 1 and 2 including a composite duct panel.
Figure 4A:
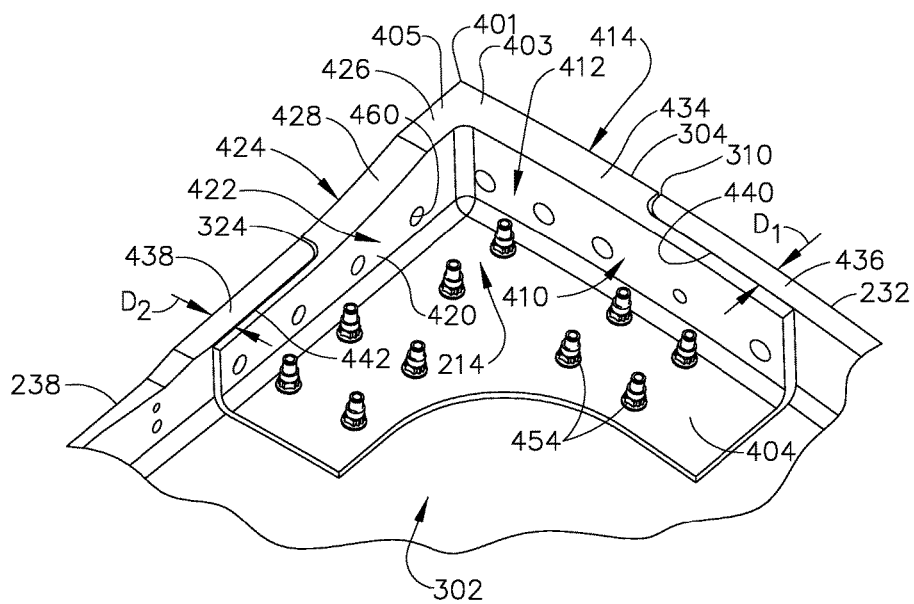
FIGS. 4A-4D are perspective views of a corner of the composite duct panel shown in FIG. 3 including a corner bracket.
Figure 4B:
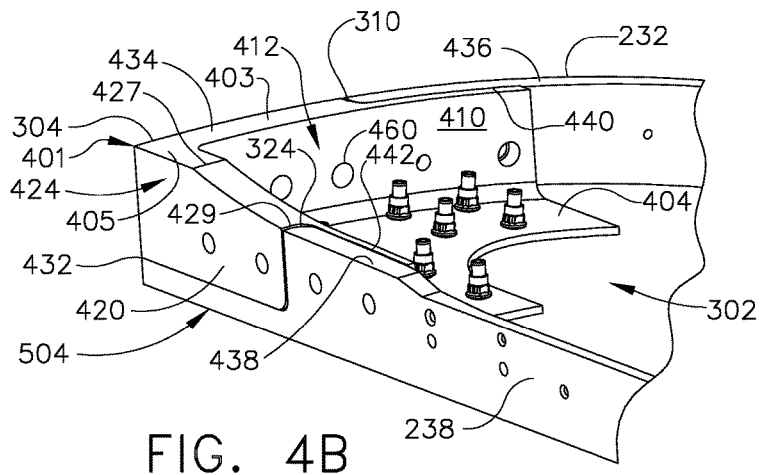
Figure 4C:
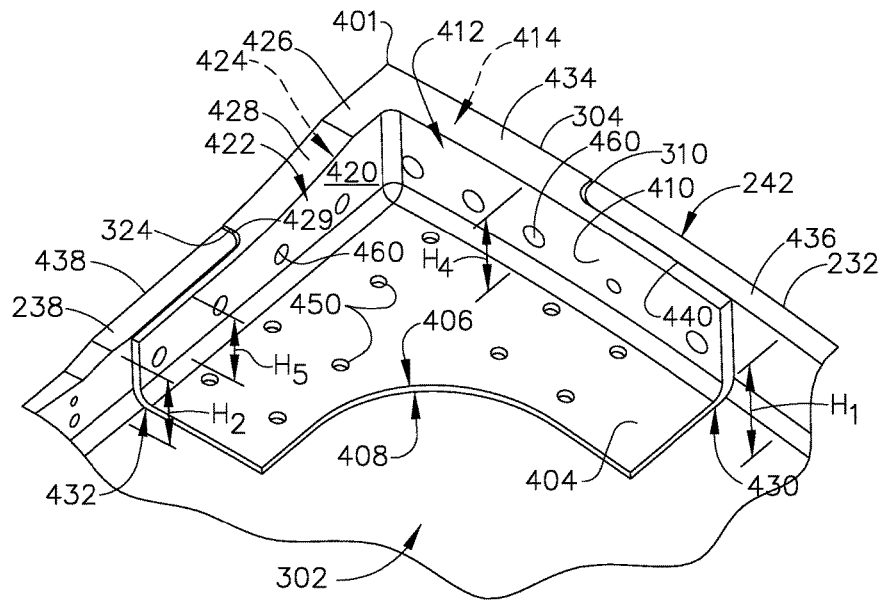
Figure 4D:
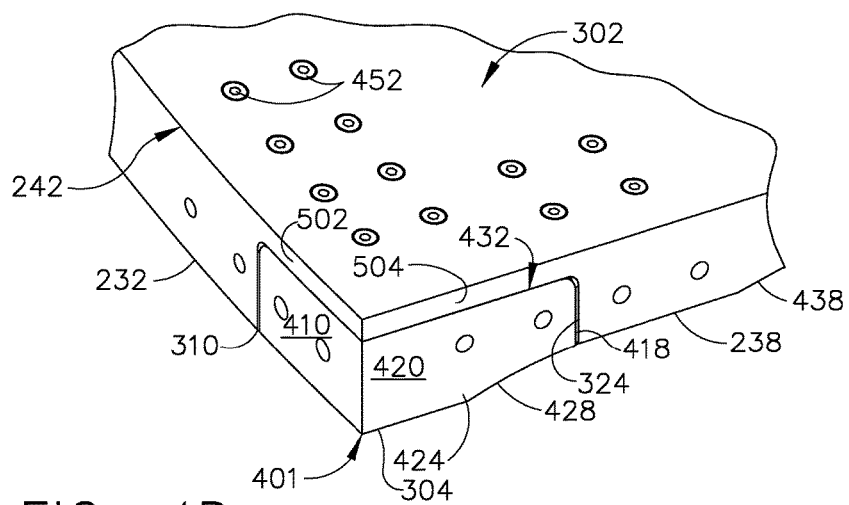

FIG. 3 is a perspective view of a first example embodiment of a composite duct panel assembly 300 of engine pod 100 (shown in FIG. 1) including a composite duct panel 302

Figure 5:
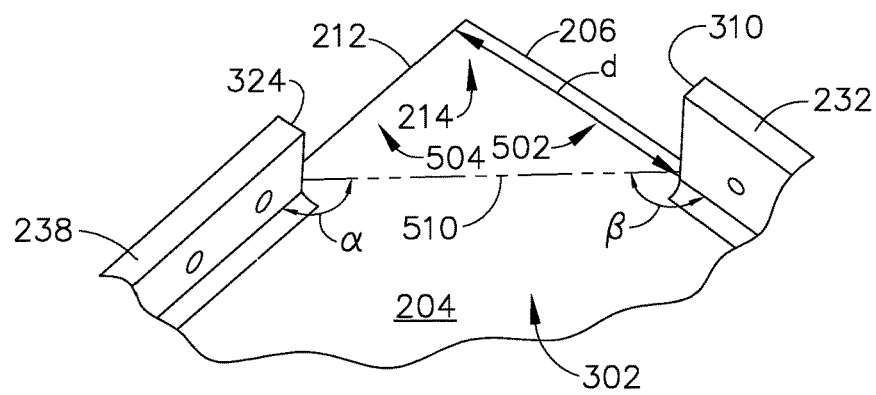
FIG. 5 is a perspective of the corner shown in FIGS. 4A-4D without the corner bracket.

(which may be similar to duct panel 202, shown in FIG. 2), FIGS. 4A-4D are perspective views of corner 214 of composite duct panel 302 including a corner bracket 304, and FIG. 5 is a perspective of corner 214 without corner bracket 304. Where elements in FIGS. 3, 4A-4D, and/or 5 are substantially identical to elements in FIG. 2, those elements share the same reference numerals. With reference to FIG. 3, composite duct panel assembly 300 includes four corner brackets 304. With further reference to FIGS. 3 and 4A-4D, corner bracket 304 is fabricated from a material different than the material used to fabricate duct panel 302. In one embodiment, corner bracket 304 is fabricated from metal (e.g., aluminum). In other embodiments, corner bracket 304 is fabricated from plastic or any other suitable material (or a combination thereof). The material of corner bracket 304 may be determined based on conditions (e.g., heat, load, connection or structural requirements, etc.) of the location of corner bracket 304. For example, in high-load regions (e.g., supporting duct panels 302 in engine pod 100), a metal corner bracket 304 may be used, whereas in lower-load regions, a composite or plastic corner bracket 304 may be used.

Corner bracket 304 is configured to replace flange corners 254, 256, 258, and 260 (shown in FIG. 2) in composite duct panel 302, thereby facilitating reducing the manufacturing difficulties associated with machining three-dimensional composite corners. In the example embodiment, the plurality of flanges 230 are particularly machined or "cut away" to end at a distance d from corners 214, 216, 218, 220. More particularly, forward flange 232 is machined to terminate at a first end 310 and an opposing second end 312, first side flange 236 is machined to terminate at a first end 314 and an opposing second end 316, aft flange 234 is machined to terminate at a first end 318 and an opposing second end 320, and second side flange 238 is machined to terminate at a first end 322 and an opposing second end 324. As illustrated in FIG. 5, forward edge 206 at corner 214 includes an exposed portion 502, and second side edge 212 includes an exposed portion 504. It should be understood that forward edge 206, aft edge 208, first side edge 210, and second side edge 212 include additional exposed portions (not shown) at the others of corners 216, 218, and 220. Moreover, adjacent ends of flanges 230 may be considered to define corner edges of composite duct panel 302 having obtuse angles. For example, as shown in FIG. 5, first end 310 of forward flange 232 and second end 324 of second side flange 238 may be considered to define a functional "corner edge" 510 of composite duct panel 302 therebetween, which in turn defines obtuse angle α between corner edge 510 and second side flange 238 and obtuse angle β between corner edge 510 and forward flange 232. Angle α measures greater than 90°, and angle β measures greater than 90°. Angle α may be, in various embodiments, greater than, less than, or substantially equal to angle β.

Each corner bracket 304 includes a base 404, a first bracket sidewall 410 that extends substantially perpendicularly from base 404, and a second bracket sidewall 420 that extends substantially perpendicularly from base 404. Base 404 includes an inner surface 406 and an outer surface 408. First bracket sidewall 410 includes an inner surface 412 and an outer surface 414. Second bracket sidewall 420 includes an inner surface 422 and an outer surface 424. In the illustrated embodiment, first bracket sidewall 410 and second bracket sidewall 420 form a substantially 90° angle at a flange corner 401 therebetween, such that corner bracket 304 extends both forward flange 232 and second side flange 238 to a 90° intersection. Accordingly, at least a portion of first bracket sidewall 410 may be referred to as a "circumferential flange extension" 403, and at least a portion of second bracket sidewall 420 may be referred to as an "axial flange extension" 405. In other embodiments, bracket sidewalls 410, 420 may define any other angle therebetween that is suitable to the application of corner bracket 304. Additionally or alternatively, corner bracket 304 may include additional bracket sidewalls to define other angles or other shapes at corner 214 of duct panel 302.

In the illustrated embodiment, first bracket sidewall 410 has a height $H_4$ that is substantially equal to height $H_1$ of forward flange 232. Second bracket sidewall 420 has a varying height along at least a portion of a top edge 426 of second bracket sidewall 420, varying between height $H_4$ and a height $H_5$ that is substantially equal to height $H_2$ of second side flange 238. More particularly, in the example embodiment, top edge 426 of second bracket sidewall 420 includes a sloping portion 428 configured to supply or bridge the difference between height $H_4$ and height $H_5$ between a first end 427 and a second end 429 thereof. Moreover, when corner bracket 304 is coupled to composite duct panel 302, sloping portion 428 is configured to supply or bridge the difference between height $H_1$ of forward flange 232 and height $H_2$ of second side flange 238. In some embodiments, taking into account machining tolerance of corner bracket 304 and/or composite duct panel 302, one or more layers of shim material 418 (e.g., an epoxy) may be applied or disposed between a bottom edge 430 of first bracket sidewall 410 and exposed portion 502 of forward edge 206 to ensure that, when corner bracket 304 is coupled to composite duct panel 302, a top edge 434 of first bracket sidewall 410 is substantially co-planar with a top edge 436 of forward flange 232. Additionally or alternatively, one or more layers of shim material 418 may be applied or disposed between a bottom edge 432 of second bracket sidewall 420 and exposed portion 504 of second side edge 212 to ensure that, when corner bracket 304 is coupled to composite duct panel 302, second end 429 of sloping portion 428 of second bracket sidewall 420 is substantially co-planar with a top edge 438 of second side flange 238. Additionally or alternatively, any of the flange thicknesses or heights described herein may be machined to be substantially equal and/or to result in a better (e.g., within lower tolerances) fit with corner bracket(s) 304.

Additionally, first bracket sidewall 410 includes a first recessed portion 440 defined in outer surface 414, and second bracket sidewall 420 includes a second recessed portion 442 defined in outer surface 424. First recessed portion 440 has a depth $D_1$ substantially equal to a thickness $T_1$ of forward flange 232, such that when corner bracket 304 is coupled to composite duct panel 302, outer surface 414 of first bracket sidewall 410 is substantially co-planar with outer surface 242 of forward flange 232. Second recessed portion 442 has a depth $D_2$ substantially equal to a thickness $T_2$ of second side flange 238, such that when corner bracket 304 is coupled to composite duct panel 302, outer surface 424 of second bracket sidewall 420 is substantially co-planar with outer surface 242 of second side flange 238. In some embodiments, $T_1$ is substantially equal to $T_2$, and, accordingly, $D_1$ is substantially equal to $D_2$. In other embodiments, $T_1$ may be less than or greater than $T_2$. In some embodiments, taking into account machining tolerance of corner bracket 304 and/or composite duct panel 302, one or more layers of shim material 418 (e.g., an epoxy or resin) may be applied or disposed between first bracket sidewall 410 and forward flange 232 to ensure the substantially co-planar relationship therebetween and/or between second bracket sidewall 420 and second side flange 238 to ensure the substantially co-planar relationship therebetween. Additionally or alternatively, in embodiments in which one or more of first bracket sidewall 410 and/or second bracket sidewall 420 has a depth (not shown) such that the one of more of first bracket sidewall 410 and/or second bracket sidewall 420 extends outwardly beyond the respective one of forward flange 232 and second side flange 238, the one or more of first bracket sidewall 410 and/or second side flange 238 may be trimmed, ground, cut, or otherwise machined to reduce the depth thereof to facilitate the above-described co-planar relationship(s). Additionally or alternatively, a stock material (not shown) may be added to composite panel 302 to facilitate machining a thickness thereof to more closely match a thickness of corner bracket(s) 304, thereby reducing a need for shim material 418.

Accordingly, corner bracket 304 is configured to replace flange corners 254, 256, 258, 260 and provide a continuous perimeter 330 of composite duct panel 302. In so doing, corner bracket 304 provides a fully consolidated, solid, and substantially planar corner for composite duct panel 302, which overcomes all of the above-described problems with three-dimensional composite corners.

In the illustrated embodiment, outer surface 408 of base 404 of corner bracket 304 is coupled against inner surface 240 of base 204 of composite duct panel 302 in a flush and/or face-to-face relationship. Corner bracket 304 may be coupled to composite duct panel 302 using any suitable fastener, such as adhesive or mechanical fasteners and/or a combination thereof. In the illustrated embodiment, base 404 of corner bracket 304 includes a plurality of bracket apertures 450, and base 204 of composite duct panel 302 includes a plurality of panel apertures 452. Corner bracket 304 is attached to composite duct panel 302 by inserting a plurality of fasteners 454 through bracket apertures 450 and panel apertures 452.

In the illustrated embodiment, first bracket sidewall 410 includes a plurality of flange apertures 460, and second bracket sidewall 420 also includes a plurality of flange apertures 460. Flange apertures 460 are configured to facilitate coupling of composite duct panel 302 to adjacent duct panels 302 and/or to other adjacent structures (e.g., fan housing 262 or aft mount ring 264, shown in FIG. 2), for example, by inserting a fastener (not shown) therethrough and into the adjacent structure. One or more of flange apertures 460 may be sized, shaped, and/or configured differently from one or more others of flange apertures 460, to facilitate connection to adjacent structures using various types, sizes, shapes, and/or configurations of fasteners.

It should be understood that although corner bracket 304 is described in detail with respect to its position at corner 214 of composite duct panel 302 between forward flange 232 and second side flange 238, corner brackets 304 at corners 216, 218, and 220 may be substantially similar to corner bracket 304 and/or share one or more similar features with corner bracket 304.

Figure 6:
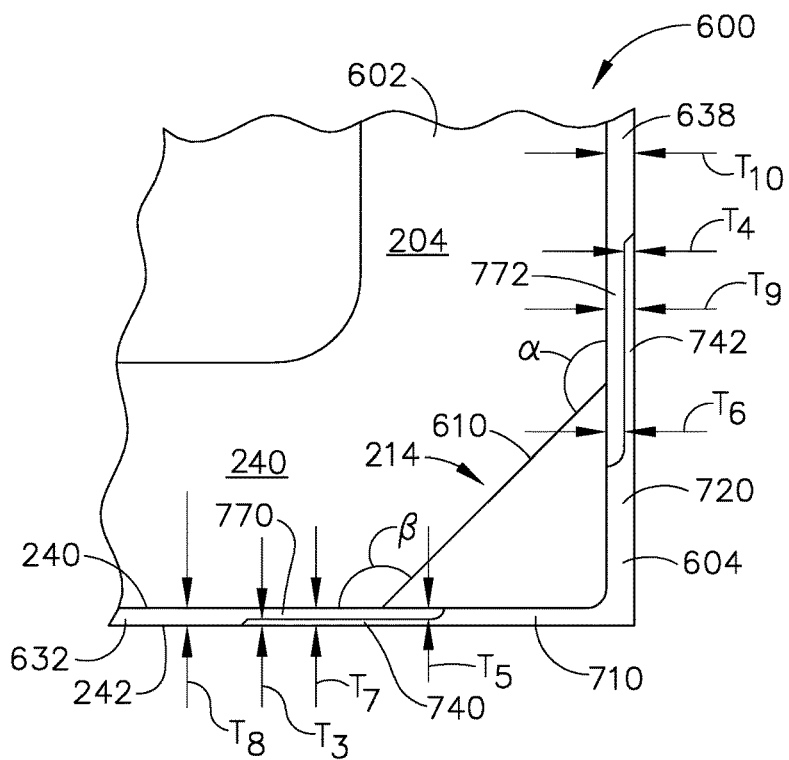
FIG. 6 is a top plan view of a second example embodiment of a composite duct panel assembly of the engine pod shown in FIGS. 1 and 2.
Figure 7:
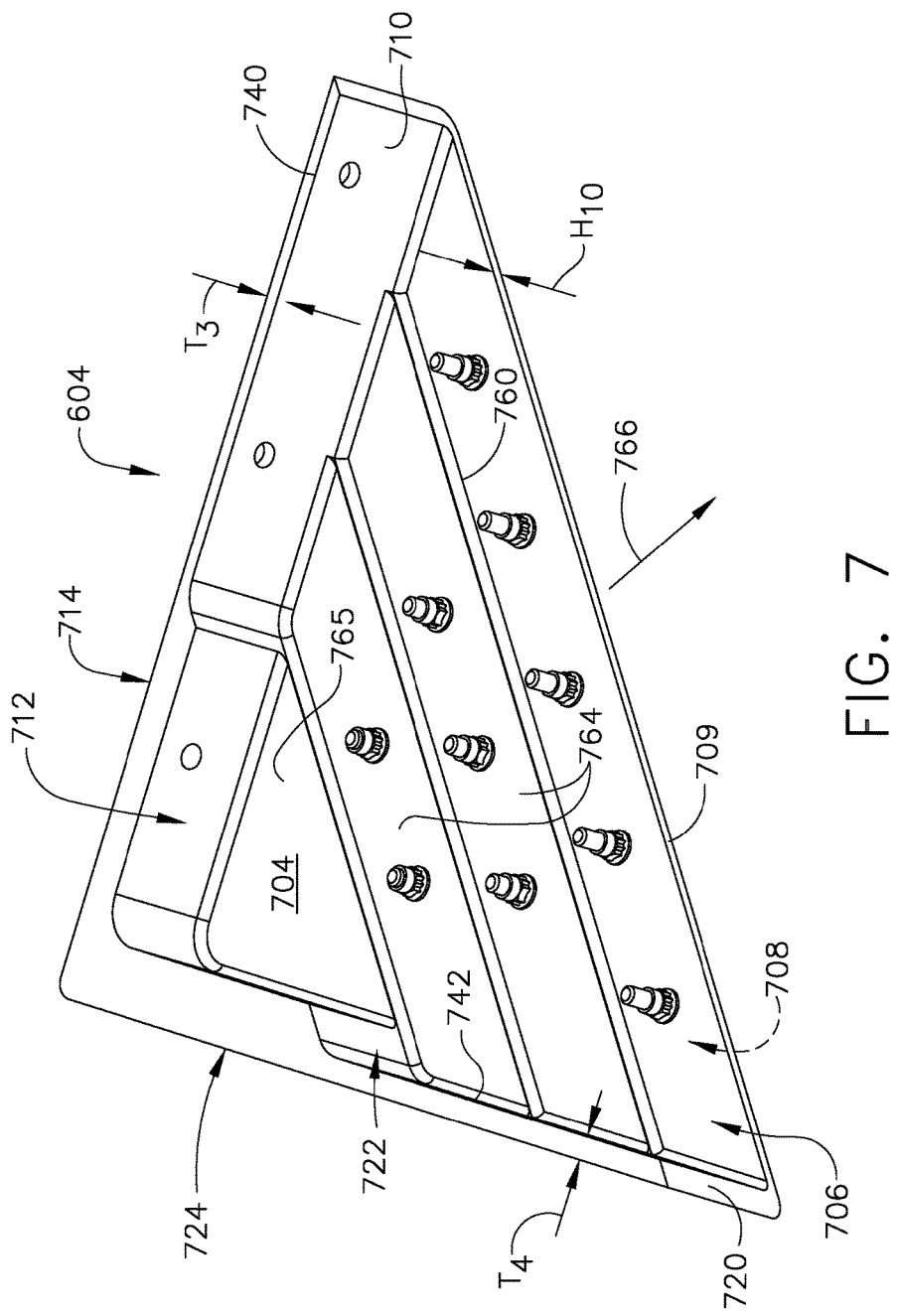
FIG. 7 is a perspective view of a second example embodiment of a corner bracket for use with the composite duct panel assembly shown in FIG. 6.

FIG. 6 is a top plan view of a second example embodiment of a composite duct panel assembly 600, more particularly an enlarged view of corner 214 of a composite duct panel 602, and FIG. 7 a perspective view of a second example embodiment of a corner bracket 604 for use with the composite duct panel assembly 600 shown in FIG. 6. Where elements shown in FIGS. 6 and/or 7 are substantially similar to elements shown in FIGS. 2, 3, 4A-4D, and/or 5, those elements share the same reference numeral.

In the illustrated embodiment of composite duct panel assembly 600, corner bracket 604 is coupled to outer surface 242 of composite duct panel 602. More specifically, an inner surface 706 of a base 704 of corner bracket 604 is coupled against outer surface 242 of base 204 of composite duct panel 602 in a flush and/or face-to-face relationship, at least a portion of an inner surface 712 of a first bracket sidewall 710 is coupled against outer surface 242 of a forward flange 632 in a flush and/or face-to-face relationship, and at least a portion of an inner surface 722 of a second bracket sidewall 720 is coupled against outer surface 242 of a second side flange 638 in a flush and/or face-to-face relationship.

Inner surface 706 of base 704 of corner bracket 604 includes a plurality of channels 760 that aid in load transfer from corner bracket 604 to composite duct panel 602. In addition, channels 760 define a plurality of ledges 764, which decrease in depth (with respect to an outer surface 708 of base 704) inwardly along a direction indicated by arrow 766. Although not shown, composite duct panel 602 includes complementary ledges on outer surface 242 of base 204 of composite duct panel 602, adjacent a corner edge 610. Ledges 764 of corner bracket 604 cooperate with the ledges of composite duct panel 602 to facilitate decreasing a height $H_{10}$ of a lip (not specifically shown) defined by an edge 709 of base 704 of corner bracket 604 when corner bracket 604 is coupled to composite duct panel 602, as well as to position a first ledge 765 of ledges 764 in a substantially coplanar relationship with corner edge 610 of composite duct panel 602.

In the illustrated embodiment, first bracket sidewall 710 includes a first recessed portion 740, and second bracket sidewall includes a second recessed portion 742. Forward flange 632 of composite duct panel 602 includes a third recessed portion 770, and second side flange 638 includes a fourth recessed portion 772. First recessed portion 740 has a thickness $T_3$, second recessed portion 742 has a thickness $T_4$, third recessed portion 770 has a thickness $T_5$, and fourth recessed portion 772 has a thickness $T_6$. First recessed portion 740 is configured to cooperate with third recessed portion 770 when corner bracket 604 is coupled to composite duct panel 602, such that a combined thickness $T_7$ of thickness $T_3$ and thickness $T_5$ is substantially equal to a thickness $T_8$ of forward flange 632. In other words, inner surface 712 of first bracket sidewall 710 is substantially co-planar with inner surface 240 of forward flange 632, and an outer surface 714 of first bracket sidewall 710 is substantially co-planar with outer surface 242 of forward flange 632. Additionally, second recessed portion 742 is configured to cooperate with fourth recessed portion 772, such that a combined thickness $T_9$ of thickness $T_4$ and thickness $T_6$ is substantially equal to a thickness $T_{10}$ of second side flange 638. In other words, inner surface 722 of second bracket sidewall 720 is substantially co-planar with inner surface 240 of second side flange 238, and an outer surface 724 of second bracket sidewall 720 is substantially co-planar with outer surface 242 of second side flange 638.

Composite duct panel assembly 600 may require additional machining and/or assembly time in comparison to composite duct panel assembly 300, in order to machine ledges and recessed portions into composite duct panel 602. However, composite duct panel assembly 600 provides an additional benefit of improved corner protection for composite duct panel 602. For example, when attaching corner bracket 604 to composite duct panel 602, or during any other handling of composite duct panel assembly 600, corner edge 610 (and respective other corner edges, not shown) of composite panel 602 is vulnerable to any impact thereto. By surrounding corner edge 610 (and respective corner edges) of composite panel 602 with corner brackets 604, that vulnerability is reduced, as corner edge 610 no longer directly contacts anything but corner bracket 604.

The above-described assemblies provide an efficient method for improving the structural characteristics of corners of a composite component, particularly a duct panel. Specifically, the above-described composite duct panel assembly includes a composite duct panel that facilitates reducing a weight of metal duct panels. Moreover, by eliminating rolled composite corner of the duct panels, machining time for each duct panel is reduced. In addition, corner brackets attached to the corners of the duct panel, such as to the base and/or perpendicularly extending flanges, improves structural characteristics (e.g., stability, strength) of the corners of the duct panel over composite corners.

Exemplary embodiments of composite duct panel assemblies are described above in detail. The composite duct panel assemblies, and methods of operating such systems and component devices are not limited to the specific embodiments described herein, but rather, components of the systems and/or steps of the methods may be utilized independently and separately from other components and/or steps described herein. Moreover, it should be understood that embodiments of the corner brackets described herein may be implemented with composite panels or other composite components other than fan duct panels. The corner brackets may replace corner flanges of composite components of other aircraft systems, and/or the corner brackets may replace corner flanges of composite components in non-aircraft systems, especially those in which weight is an important factor. For example, flange corners of composite components in vehicle systems, air-conditioning systems, building or structural systems, etc. may be configured to include any of the corner bracket embodiments as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite duct panel assembly, said composite duct panel assembly comprising:
   a composite duct panel including a curved cross-section in a circumferential direction and a width that is based on said composite duct panel comprising a portion of a circumference of an annular bypass duct, at least two adjacent corners of said composite duct panel greater than 90°; and
   one or more corner brackets coupled to said at least two adjacent corners of said composite duct panel.

2. The composite duct panel assembly of claim 1, wherein said composite duct panel includes a forward edge, an aft edge, and at least one side edge extending therebetween, at least one of said forward edge and said aft edge separated from said at least one side edge by a corner edge.

3. The composite duct panel assembly of claim 1, wherein a plurality of composite duct panel assemblies forms an annular aircraft engine fan bypass duct.

4. The composite duct panel assembly of claim 1, wherein said composite duct panel comprises a plurality of split composite laminated perpendicular axial flanges comprising a plurality of plies of fiber material.

5. The composite duct panel assembly of claim 4, wherein said one or more corner brackets are coupled to said composite duct panel flush with an outer surface of said plurality of split composite laminated perpendicular axial flanges.

6. The composite duct panel assembly of claim 1, wherein said composite duct panel is formed of a composite laminate comprising a plurality of plies reinforced by fibers.

7. The composite duct panel assembly of claim 6, wherein each of said plurality of plies includes a polymer matrix, and the fibers include carbon fibers held within an epoxy matrix.

8. A composite duct panel assembly comprising:
   a composite duct panel comprising:
      a curved cross-section in a circumferential direction;
      a length extending axially along an axial first edge and a width extending along a circumferential second edge;
      a circumferential flange extending orthogonally away from said composite duct panel in a first direction along said circumferential second edge; and
      an axial flange extending orthogonally away from said composite duct panel in the first direction along said axial first edge; and
   a corner bracket coupled to said composite duct panel, said circumferential flange, and said axial flange, said corner bracket comprising:
      a base configured to couple to said composite duct panel;
      a first corner sidewall extending orthogonally away from said base in the first direction along a circumferential edge of said base;
      a second corner sidewall extending orthogonally away from said base in the first direction along an axial edge of said base; and
      a flange corner comprising an axial flange extension and a circumferential flange extension intersecting at a 90° angle, said flange corner extending said axial flange and said circumferential flange to an intersection at a corner of said composite duct panel.

9. The composite duct panel assembly of claim 8, wherein said composite duct panel is formed of a first material and said corner bracket is formed of a second material different from the first material.

10. The composite duct panel assembly of claim 8, wherein said base, first corner sidewall, second corner sidewall, and flange corner are integrally formed.

11. The composite duct panel assembly of claim 8, wherein said first bracket sidewall includes a first recessed portion coupled to said circumferential flange and said second bracket sidewall includes a second recessed portion coupled to said axial flange.

12. The composite duct panel assembly of claim 8, wherein said circumferential flange has a first height and said axial flange has a second height, said first bracket sidewall has a third height equal to said first height, and said second bracket sidewall includes a sloping portion configured to slope from said third height to a fourth height equal to said second height.

13. A turbofan engine pod comprising:
a core engine including a multistage compressor;
a fan powered by a power turbine driven by gas generated in said core engine;
an inner core cowl at least partially surrounding said core engine; and
an outer composite duct panel assembly comprising a composite duct panel having a curved cross-section in a circumferential direction, a width of said composite duct panel based on said composite duct panel comprising a portion of a circumference of an annular flow duct, at least two adjacent corners of said composite duct panel greater than 90°, wherein said composite duct panel comprises a plurality of split composite laminated perpendicular axial flanges comprising a plurality of plies of fiber material, and wherein said composite duct panel assembly further comprises one or more corner brackets coupled to said at least two adjacent corners of said composite duct panel.

14. The turbofan engine pod of claim 13, wherein said composite duct panel includes a forward edge, an aft edge, and at least one side edge extending therebetween, at least one of said forward edge and said aft edge separated from said at least one side edge by a corner edge.

15. The turbofan engine pod of claim 13, wherein a plurality of composite duct panel assemblies forms an annular aircraft engine fan duct.

16. The turbofan engine pod of claim 13, wherein said one or more corner brackets are coupled to said composite duct panel flush with an outer surface of said plurality of split composite laminated perpendicular axial flanges.

17. The turbofan engine pod of claim 13, wherein said composite duct panel is formed of a composite laminate comprising a plurality of plies reinforced by fibers.

18. A composite panel assembly comprising:
a composite panel including a first planar surface, at least one connecting flange extending away from said first planar surface, and at least two adjacent corners of greater than 90°; and
one or more corner brackets coupled to said at least two adjacent corners of said composite panel.

19. The composite duct panel assembly of claim 18, wherein said composite panel includes a forward edge, an aft edge, and at least one side edge extending therebetween, at least one of said forward edge and said aft edge separated from said at least one side edge by a corner edge.

20. The composite duct panel assembly of claim 18, wherein a plurality of composite panel assemblies forms an annular aircraft engine fan bypass duct.

* * * * *